No. 681,912. Patented Sept. 3, 1901.
P. F. GIBBONS.
BUTTER CUTTER.
(Application filed June 1, 1901.)
(No Model.) 2 Sheets—Sheet 1.

No. 681,912. Patented Sept. 3, 1901.
P. F. GIBBONS.
BUTTER CUTTER.
(Application filed June 1, 1901.)
(No Model.) 2 Sheets—Sheet 2.

Witnesses:
Chas. E. Gorton.
A. Gustafson.

Inventor:
Pierce F. Gibbons.
By Chas. C. Tillman Atty.

UNITED STATES PATENT OFFICE.

PIERCE F. GIBBONS, OF CHICAGO, ILLINOIS.

BUTTER-CUTTER.

SPECIFICATION forming part of Letters Patent No. 681,912, dated September 3, 1901.

Application filed June 1, 1901. Serial No. 62,706. (No model.)

*To all whom it may concern:*

Be it known that I, PIERCE F. GIBBONS, a citizen of the United States, residing at Chicago, in the county of Cook and State of Illinois, have invented certain new and useful Improvements in Butter-Cutters, of which the following is a specification.

This invention relates to improvements in a device which is more especially intended for use in hotels and restaurants for cutting butter into small pieces, so that the same may be conveniently served in individual portions, but it may be used for cutting other plastic material; and it consists in certain peculiarities of the construction, novel arrangement, and operation of the various parts thereof, as will be hereinafter more fully set forth, and specifically claimed.

The principal object of my invention is to provide a butter-cutter which shall be simple, inexpensive, durable, and effective in operation and shall be so made as to cut the butter into small pieces and in such a manner that said pieces will have an attractive appearance or, in other words, will be clean cut without ragged edges.

As butter is now generally supplied to hotels and restaurants in cakes of uniform size and weight and usually in brick-shaped packages, another object of my invention is to so construct the cutter that the cake of butter will be divided into the desired number of pieces by one movement of the cutter-handle.

Other objects and advantages of the invention will be disclosed in the subjoined description.

In order to enable others skilled in the art to which my invention pertains to make and use the same, I will now proceed to describe it, referring to the accompanying drawings, in which—

Figure 1:
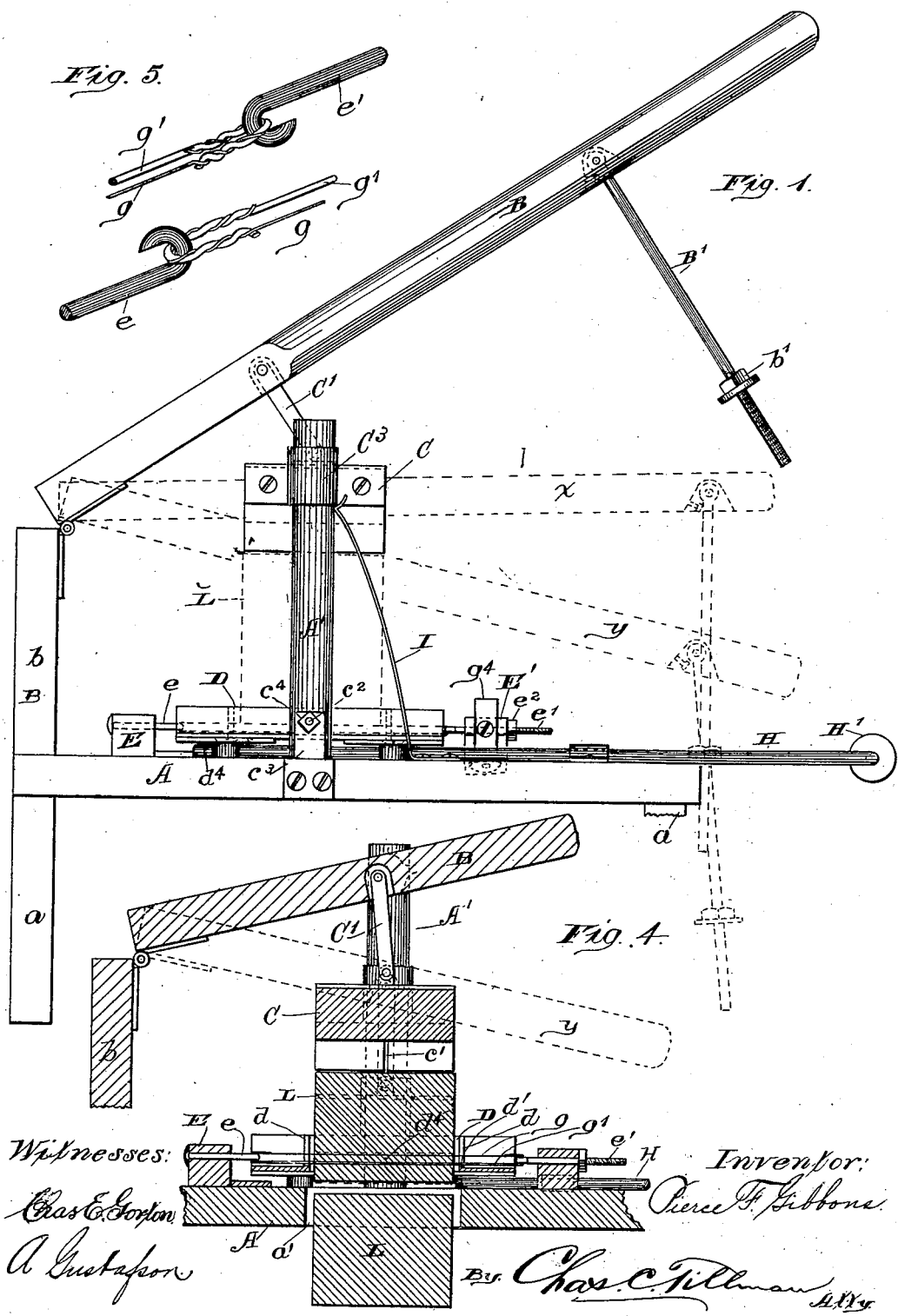
Figures 2, 3:
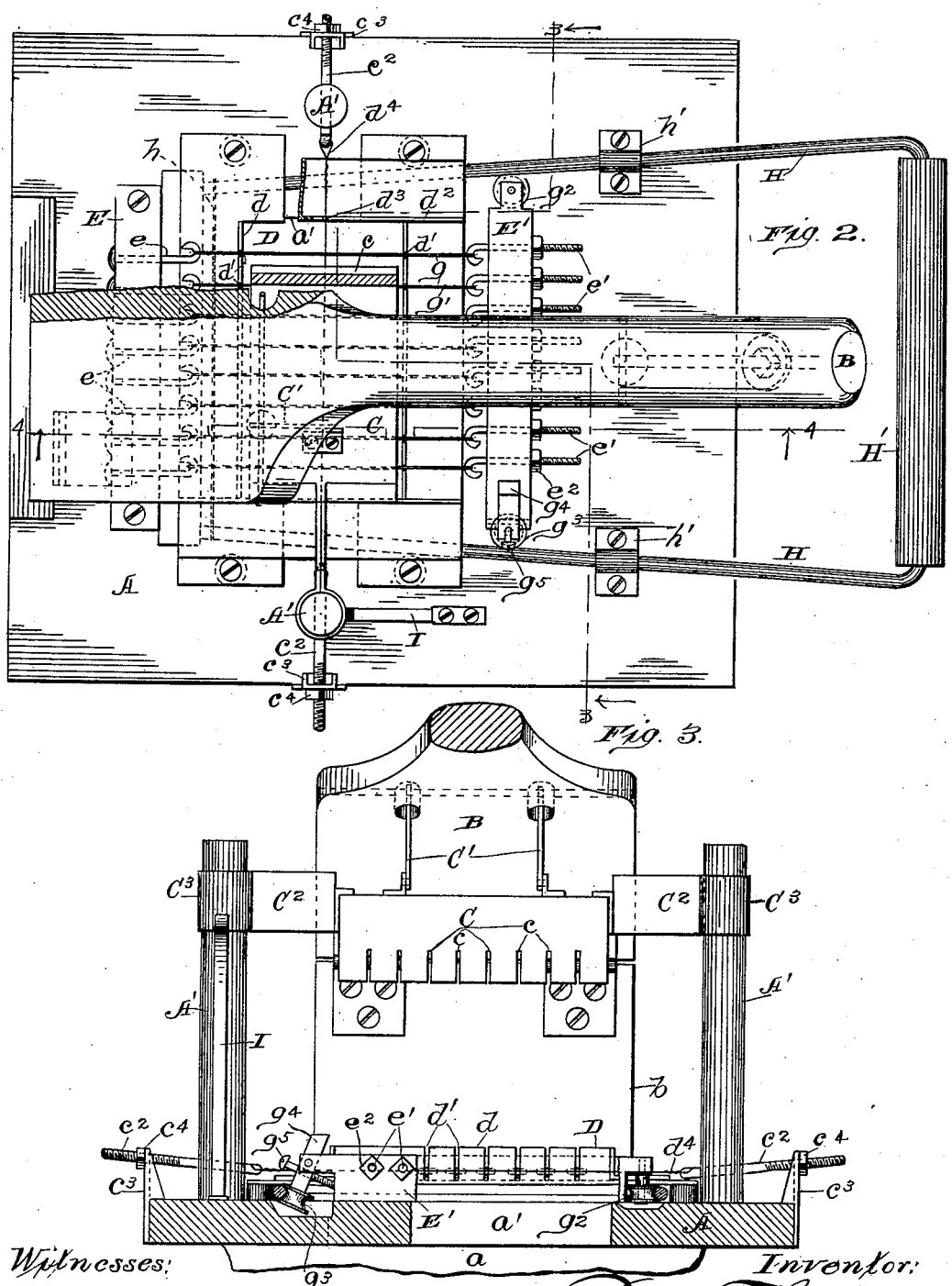

Figure 1 is a view in side elevation of a butter-cutter embodying my invention and illustrating by dotted lines the position which the plunger-handle will occupy in the process of forcing the butter through the cutting-receptacle. Fig. 2 is a plan view of the cutter, showing the parts in position to receive the cake of butter. Fig. 3 is a view, partly in section and partly in elevation, taken on line 3 3 of Fig. 2 looking in the direction indicated by the arrows. Fig. 4 is a fragmental sectional view taken on line 4 4 of Fig. 2 looking in the direction indicated by the arrows, and Fig. 5 represents perspective views of portions of the transverse cutting-wires and their securing-hooks.

Similar letters refer to like parts throughout the different views of the drawings.

A represents the base-plate on which the cutting mechanism is mounted and which plate or piece is supported by means of legs $a$, so as to permit a dish or plate to be placed thereunder to receive the pieces of butter after they have been cut. At one end of the base-plate A is provided an upright $b$, to which is hinged at one of its ends the plunger-handle B, which carries near its other end a check-rod B', which is usually pivotally secured at its upper end to the handle B and has its lower portion screw-threaded and provided with a nut $b'$, used for regulating the stroke of the handle B, as will be presently explained.

The base-plate A is formed at about its middle with an opening $a'$, which is preferably rectangular in shape to permit of the passage of the butter therethrough. The upper surface of the base-plate A is provided near its side edges with standards A', usually cylindrical in form, as shown, and are for the purpose of guiding and bracing the plunger C, which is pivotally connected to the plunger-handle B by means of links C' or otherwise. The plunger C is provided with a series of transverse recesses $c$ in its lower portion and with a longitudinal recess $c'$, which is also located in its lower portion and which recesses extend upwardly to about the middle of the plunger, as is clearly shown, and are for the reception of the cross-wires and a longitudinal wire, which extend across the butter-receptacle, as will be presently explained. Secured to the upper portion of the plunger C and at the ends thereof are brackets $C^2$, each of which has at its outer end a collar $C^3$ of a size and form to fit the standards A' and are used in coöperation with said standards to guide and brace the plunger.

Secured to the upper surface of the base-plate A, above the opening therein, is a box-like receptacle D, which has its top and bottom open, so as to register with the opening $a'$ in the base-plate. The sides $d$ of this receptacle are provided with a series of vertical slots $d'$, and the end pieces $d^2$ thereof are each provided about their middle with an opening or slot $d^3$ for the passage of a wire $d^4$, which extends longitudinally through said receptacle and has its ends secured to adjusting-screws $c^2$, located in the lower portion of the standard $A'$, and in suitable brackets $c^3$, secured to the side edges of the base-plate. The screw-threaded portions of the adjusting-screws $c^2$ are provided with nuts $c^4$, employed for adjusting said screws so as to give the wire $d^4$ the desired tension.

Located near the rear portion of the box or receptacle D and secured to the upper surface of the base-plate is a brace-bar E, through which is passed a series of hooks $e$, which engage one of the ends of the wires $g$ and $g'$, the other ends of which are engaged by hooked adjusting-screws $e'$, located in the brace-bar E', which bar is secured to the base-plate near the front portion of the box D or butter-receptacle. The screw-threaded portions of the hooked adjusting-screws $e'$ are provided with nuts $e^2$, employed for adjusting said screws so as to regulate the tension of the wires $g$ and $g'$, which pass through the recesses $d'$ in the sides of said receptacle. At one of its ends the brace-bar E' is provided with an antifriction-roller $g^2$ and at its other end with a similar roller $g^3$, which is journaled on a shaft $g^4$, pivotally secured to the bar E', as is clearly shown in Fig. 3 of the drawings. Passing through the shaft $g^4$ is a screw $g^5$, the end of which rests against the bar E' and is employed for adjusting the position of the roller $g^3$ and for regulating the tension of the cutting-wire $h$, which is attached at its ends to the cutter-handle H near the free ends thereof. This cutter-handle is preferably formed of wire, bent to form substantially three sides of a rectangular figure, and usually has on its outer portion a wooden handle H' to be clasped by the hand of the operator. The cutter-handle H is secured to the upper surface of the base-plate by means of guide-pieces $h'$ and has its sides resting against the rollers $g^2$ and $g^3$, as is clearly shown in Figs. 2 and 3 of the drawings, and the ends of the sides are slightly drawn together, as shown in Fig. 2, so that when the handle is drawn outwardly, in which operation the cutting-wire $h$ will come in contact with the butter, it will be held taut by reason of the said rollers, which press the sides of the handle outwardly. The handle being made of wire will yield sufficiently to permit its outward movement and yet will hold the wire $h$ on a strain.

Secured to the upper surface of the base-plate, near one of the standards A', is a spring I, which normally presses at its upper portion against said standard and is for the purpose of retaining the plunger C in its raised position until it is desired to use the same, for it is apparent that the upper end of said spring will rest under one of the collars $C^3$ which the plunger carries.

The operation is simple and as follows: When the plunger and its handle B are raised to the position shown by full lines in Fig. 1 of the drawings, the cake of butter L may be placed in the receptacle D, so as to rest on the wires $g$, extending crosswise thereof. By disengaging the spring I from the standard A' the plunger can be pressed down to the position shown by dotted lines at $x$ in Fig. 1, in which operation one-half of the cake of butter will be forced through the box D and opening $a'$ in the base-plate. When thus forced through, the transverse wires $g$ and $g'$ will divide the cake or butter transversely, and the wire $d^4$, which extends longitudinally of the receptacle D, will divide said cake longitudinally. When the parts are in this position, the cutter-handle H is drawn forward, thus causing the wire $h$ to sever the divided portions of the cake of butter and allow them to fall into the receptacle therefor below the base-plate. By releasing the check-rod B' from the edge of the base-plate the plunger may be pressed down, so that the handle B thereof will occupy the position shown by dotted lines at $y$ in Fig. 1 of the drawings, which operation will force the balance of the cake of butter through the receptacle D and opening $a'$ in the base-plate. It will be observed that the transverse wires $g$ are much smaller than the wires $g'$ and that they are attached by being twisted together at their ends, as is clearly shown in Fig. 5 of the drawings. By having the upper transverse wires smaller than the lower ones it is apparent that the smaller or upper wires will first divide the cake, and the lower or larger wires will serve to further separate the pieces, thus attaining the operation of knife-blades, having one of their edges thin and their other edges thicker without the area or surface to which the butter would cling.

The cutter-handle and its wire may sometimes be omitted when it is desired to cut the butter into pieces known as "hotel-bars"— that is, pieces larger than those formed when said handle is employed.

Having thus fully described my invention, what I claim as new, and desire to secure by Letters Patent, is—

1. In a butter-cutter, the combination with a base-plate having an opening, of a butter-receptacle supported above said opening, wires extending across and longitudinally of said receptacle and having means to regulate their tension, a cutter-handle movably secured below said receptacle and carrying on its inner portion a cutting-wire, a plunger-handle pivotally secured at one of its ends and located above the butter-receptacle, a plunger pivotally connected to said handle and having transverse and longitudinal recesses in its lower surface for the reception of the wires across the butter-receptacle, substantially as described.

2. In a butter-cutter, the combination with a base-plate having an opening and provided with standards near said opening, of a butter-receptacle supported above said opening, wires extending across and longitudinally of said receptacle and having means to regulate their tension, a cutter-handle movably secured below said receptacle and carrying on its inner portion a cutting-wire, a plunger-handle pivotally secured at one of its ends and located above the butter-receptacle, a plunger pivotally connected to said handle and having transverse and longitudinal recesses in its lower portion, brackets secured to the ends of the plunger and having collars to embrace the said standards, substantially as described.

3. In a butter-cutter, the combination with a base-plate having an opening, of a butter-receptacle supported above said opening, a series of small wires extending in parallelism across said receptacle, a series of larger wires located vertically below the first-named wires and in parallelism across said receptacle, a wire extending longitudinally of said receptacle, means to regulate the tension of said wires, a cutter-handle movably secured below the butter-receptacle and carrying on its inner portion a cutting-wire, and means to force the butter through the receptacle, substantially as described.

4. In a butter-cutter, the combination with a base-plate having an opening and provided with standards near said opening, of a butter-receptacle supported above said opening, wires extending across and longitudinally of said receptacle and having means to regulate their tension, a cutter-handle movably secured below said receptacle and carrying on its inner portion a cutting-wire, a plunger-handle pivotally secured at one of its ends and located above the butter-receptacle and provided with a check-rod having a nut adjustably secured thereon, a plunger pivotally connected to said handle and having transverse and longitudinal recesses in its lower surface, brackets secured to the ends of the plunger and having collars to embrace the said standards, substantially as described.

5. In a butter-cutter, the combination with a base-plate having an opening and provided with a standard near each end of said opening, of a butter-receptacle supported above said opening, wires extending across and longitudinally of said receptacle and having means to regulate their tension, a roller journaled near one end of the butter-receptacle, another roller journaled near the other end of the receptacle, and having means to adjust it, a cutter-handle horizontally movably secured on the upper surface of the base-plate, and having its sides in engagement with said rollers, a cutting-wire secured to the inner portion of said handle, a plunger-handle pivotally secured at one of its ends and located above the receptacle, a plunger pivotally connected to said handle and having transverse and longitudinal recesses in its lower portion, and brackets secured to the ends of the plunger and having collars to embrace the said standards, substantially as described.

6. In a butter-cutter, the combination of a butter-receptacle, with a series of small wires extending in parallelism across said receptacle, and a series of larger wires located directly below the first-named wires and in parallelism across said receptacle, substantially as described.

PIERCE F. GIBBONS.

Witnesses:
 CHAS. C. TILLMAN,
 A. GUSTAFSON.